2 Sheets—Sheet 1.

W. A. BOYDEN.
PISTON PACKING.

No. 179,444. Patented July 4, 1876.

Witnesses
Thomas J. Bewley
Geo. C. Hetzel

Inventor
William A. Boyden
per Stephen Ustick, Attorney

N. PETERS, PHOTO-LITHOGRAPHER, WASHINGTON, D. C.

2 Sheets—Sheet 2.

W. A. BOYDEN.
PISTON PACKING.

No. 179,444. Patented July 4, 1876.

UNITED STATES PATENT OFFICE.

WILLIAM A. BOYDEN, OF HARRISBURG, PENNSYLVANIA.

IMPROVEMENT IN PISTON-PACKINGS.

Specification forming part of Letters Patent No. 179,444, dated July 4, 1876; application filed March 11, 1876.

*To all whom it may concern:*

Be it known that I, WILLIAM A. BOYDEN, of Harrisburg, in the county of Dauphin and State of Pennsylvania, have invented a new and useful Improvement in Piston-Packing, of which the following is a full, clear, and exact description, reference being had to the accompanying drawings.

My invention consists of any desirable number of screw-bolts arranged radially with the piston-rod, and having their heads resting in recesses or pockets of the piston-head, in combination with followers against the inner packing-rings and spiral springs, which surround the bolts and nuts upon said bolts, between which the springs are arranged, their inner ends resting in concentric pockets of the nuts, and their outer ends in like pockets of the followers, in such a manner that when the packing-rings are arranged in the cylinder, and the springs, nuts, and followers put in their places in connection with the bolts, so as to have the followers bear with sufficient force against the packing-rings, the force of the springs will be continually exerted upon the packing as it wears away, without the necessity of readjustment, as in the use of other devices. The bolts are provided with jam-nuts inside the pocket-nuts.

Figure 1:
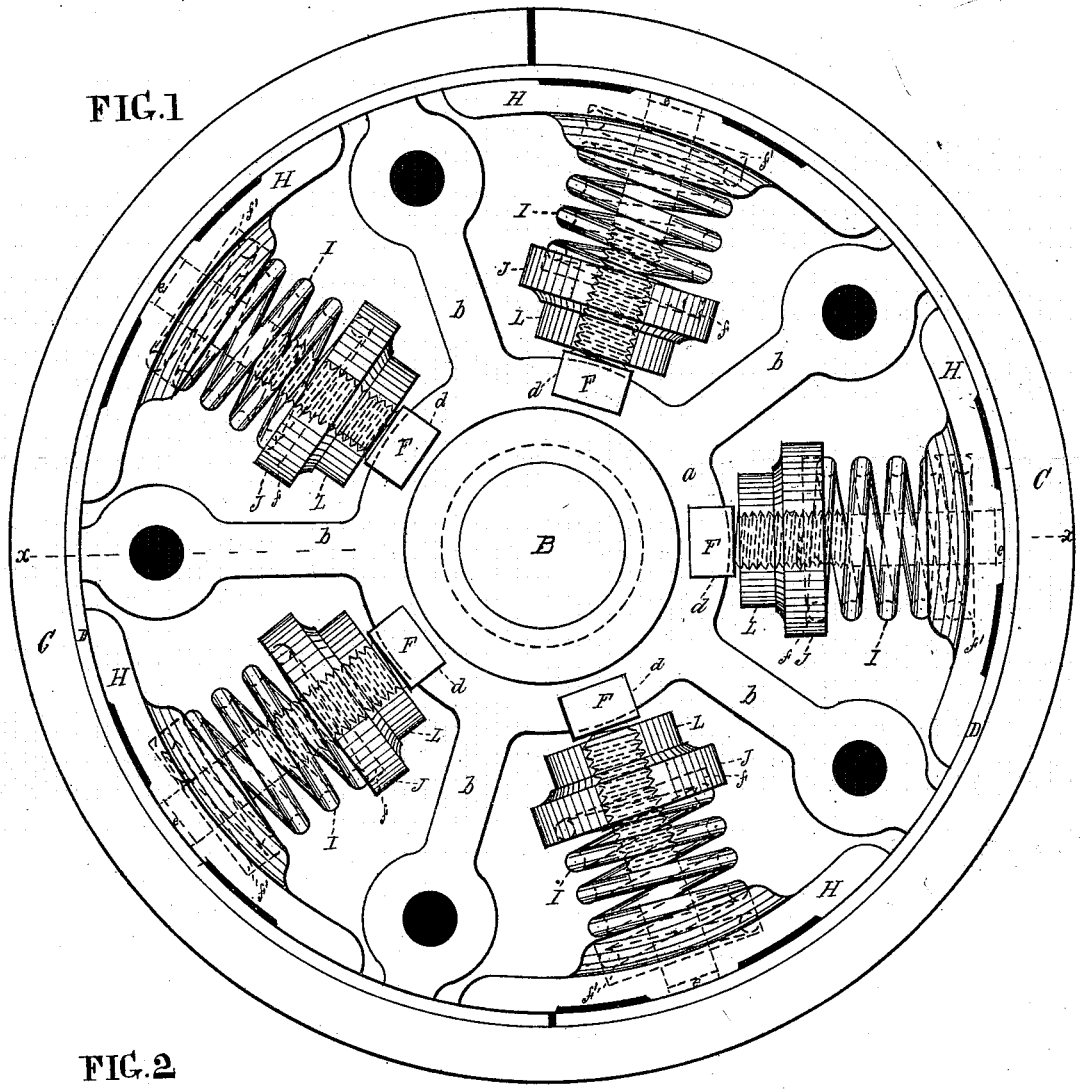
Figure 2:
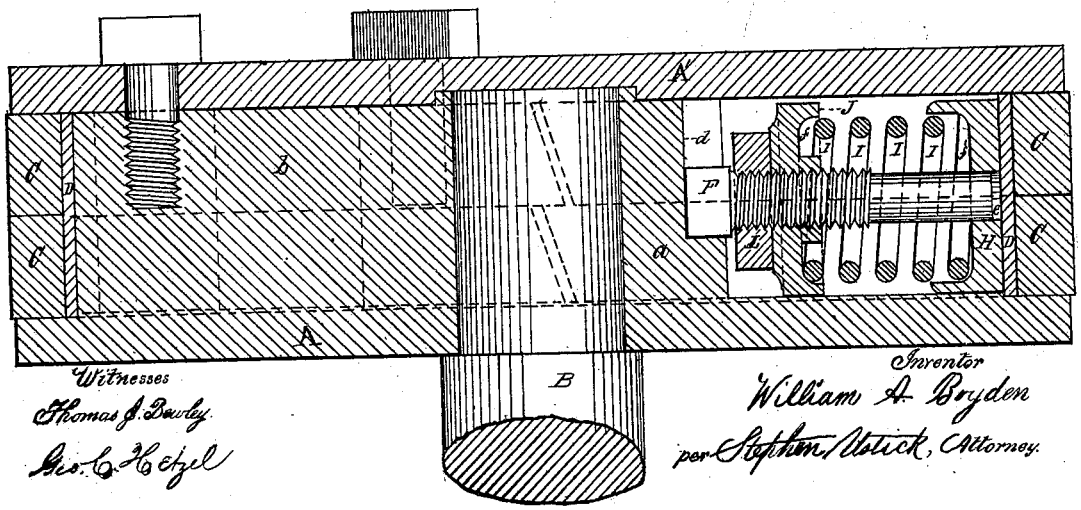
Figure 3:
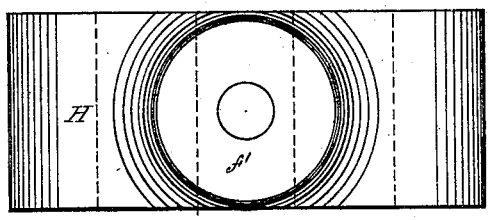
Figure 4:
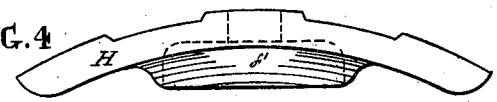
Figure 5:
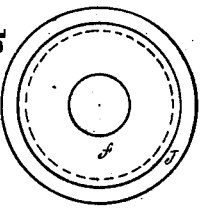
Figure 6:
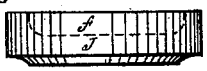

In the accompanying drawings, Figure 1 is a side view of a piston having my improved packing, with the cap-plate A removed. Fig. 2 is a cross-section taken at the line x x of Fig. 1, with the cap-plate A' in its place. Figs. 3 and 4 are side and edge views of one of the packing-followers H, having a spring-pocket, f'. Figs. 5 and 6 are like views of one of the back nuts J, having a spring-pocket, f.

Like letters of reference in all the figures indicate the same parts.

A is the standing-plate of the piston-head, having a hub, a, from which extend radial arms b, with which the cap-plate A' is connected, in the usual manner. B is the piston-rod. C C are the outside packing-rings, and D the inner ring. The hub a has recesses d, which are for holding the heads of the radial bolts F. The tail ends of the bolts are held by the holes e in the segmental followers H, which are forced outward by the springs I, which surround the bolts F, the inner ends of the springs being placed in the pockets f of the nuts J of the bolts, and their outer ends in the pockets f' of the said segmental followers H, whereby the followers are pressed against the ring D, and set out the packing-rings C C against the inner surface of the cylinder, the nuts J being adjusted to give the proper degree of pressure to the rings. Inside of the nuts J are jam-nuts L, which effectually prevent the nuts J becoming loose upon the screw-bolts.

It will readily be seen that when the cap-plate A is removed, as in Fig. 1, each bolt F, provided with a nut, J, and jam-nut L, and having a spring, I, and follower H, in connection, is easily put in place by having the nut and jam-nut brought farther inward upon the bolts, so as to take the pressure of the spring off the segmental follower, whereby it may be slipped within the inner ring D, and the head of the bolt into the recess. When these are all in position the nuts and jam-nuts are screwed up sufficiently tight to produce the requisite pressure of the follower upon the inner ring D to set up the packing-rings C C. When these are properly set they will still be held up by the springs as they wear away.

I claim as my invention—

1. The segmental followers H, having holes e and pockets f', in combination with the ring D, radial bolts F, and springs I, substantially in the manner and for the purpose set forth.

2. The back nuts J, having pockets f, in combination with the radial bolts F and springs I, substantially as and for the purpose set forth.

3. The combination of the radial bolts F, nuts J and L, segmental followers H, and springs I with the hub a and ring D, substantially in the manner and for the purpose set forth.

WM. A. BOYDEN.

Witnesses:
EDWARD SNYDER,
EUGENE SNYDER.